US011044685B2

(12) United States Patent
Alpert et al.

(10) Patent No.: US 11,044,685 B2
(45) Date of Patent: Jun. 22, 2021

(54) FAST STEERING TIMING AND RESOURCE ALLOCATION

(71) Applicant: Intel IP Corporation, Santa Clara, CA (US)

(72) Inventors: Yaron Alpert, Hod Hasharoni (IL); Chittabrata Ghosh, Fremont, CA (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 299 days.

(21) Appl. No.: 16/305,769

(22) PCT Filed: Jun. 21, 2017

(86) PCT No.: PCT/US2017/038599
§ 371 (c)(1),
(2) Date: Nov. 29, 2018

(87) PCT Pub. No.: WO2017/223234
PCT Pub. Date: Dec. 28, 2017

(65) Prior Publication Data
US 2020/0329440 A1 Oct. 15, 2020

Related U.S. Application Data

(60) Provisional application No. 62/352,618, filed on Jun. 21, 2016.

(51) Int. Cl.
*H04W 56/00* (2009.01)
*H04W 16/28* (2009.01)
(Continued)

(52) U.S. Cl.
CPC ......... *H04W 56/001* (2013.01); *H04W 16/28* (2013.01); *H04W 48/16* (2013.01);
(Continued)

(58) Field of Classification Search
CPC ... H04W 56/001; H04W 16/28; H04W 48/16; H04W 48/18; H04W 72/0446;
(Continued)

(56) References Cited

U.S. PATENT DOCUMENTS 10,506,502 B2 * 12/2019 Martinez Tarradell ......................
H04W 74/008
2006/0223449 A1 * 10/2006 Sampath ............... H04L 1/0026
455/69

(Continued)

FOREIGN PATENT DOCUMENTS

CN    103684675 A    3/2014
CN    103828457 A    5/2014
(Continued)

OTHER PUBLICATIONS

"International Application Serial No. PCT US2017 038599, International Preliminary Report on Patentability dated Jan. 3, 2019", 7 pgs.

(Continued)

*Primary Examiner* — Julio R Perez
(74) *Attorney, Agent, or Firm* — Schwegman Lundberg & Woessner, P.A.

(57) ABSTRACT

Embodiments of fast steering timing and resource allocation are generally described herein. In some embodiments, a non-access point station (STA) decodes a fast steering timing signaling element (STSE) at a Narrow Band Control sub-Channel (NB-C-CH) and from an allocator device, the STSE indicating at least fast steering timing information, an identified Narrow Band Service sub-Channel (NB-S-CH), resource allocation information for the identified NB-S-CH, and connectivity information for the identified NB-S-CH, the identified NB-S-CH being selected from a plurality of NB-S-CHs. The STA exchanges packets in the NB-S-CH according to the resource allocation information and the (Continued)

connectivity information and based on the fast steering timing information. The STA encodes or decodes data associated with the exchanged packets.

28 Claims, 7 Drawing Sheets

(51) Int. Cl.
*H04W 48/16* (2009.01)
*H04W 48/18* (2009.01)
*H04W 72/04* (2009.01)
*H04W 72/12* (2009.01)
*H04W 88/06* (2009.01)

(52) U.S. Cl.
CPC ....... *H04W 48/18* (2013.01); *H04W 72/0446* (2013.01); *H04W 72/1289* (2013.01); *H04W 88/06* (2013.01)

(58) Field of Classification Search
CPC . H04W 72/1289; H04W 88/06; H04W 72/04; H04W 56/00
See application file for complete search history.

(56) References Cited

U.S. PATENT DOCUMENTS

| | | |
|---|---|---|
| 2013/0279355 A1 | 10/2013 | Sadek et al. |
| 2014/0028480 A1 | 1/2014 | Fallon et al. |
| 2016/0056984 A1 | 2/2016 | Liberg et al. |
| 2016/0135199 A1 | 5/2016 | Wang et al. |
| 2018/0139725 A1* | 5/2018 | Takeda ................ H04L 27/2602 |
| 2018/0205412 A1* | 7/2018 | Lin ........................ H04B 1/408 |
| 2019/0357107 A1* | 11/2019 | Rico Alvarino ........ H04W 4/70 |
| 2020/0359421 A1* | 11/2020 | Yl .......................... H04L 5/0007 |

FOREIGN PATENT DOCUMENTS

| | | |
|---|---|---|
| CN | 103959694 A | 7/2014 |
| CN | 104769878 A | 7/2015 |
| CN | 109565766 | 4/2019 |
| EP | 3473041 A1 | 4/2019 |
| WO | 2013067386 | 5/2013 |
| WO | WO-2017223234 A1 | 12/2017 |

OTHER PUBLICATIONS

"European Application Serial No. 17816159.2, Extended European Search Report dated Jan. 13, 2020", 6 pgs.
"European Application Serial No. 17816159.2, Response filed Jul. 10, 2020 to Extended European Search Report dated Jan. 13, 2020", 11 pgs.
"3GPP TSGRAN EUTRA LTE physical layer General description Release 13", 3GPP TS 36.201 V13.1.0, (Mar. 24, 2016).
"International Application Serial No. PCT/US2017/038599, International Search Report dated Oct. 27, 2017", 3 pgs.
"International Application Serial No. PCT/US2017/038599, Written Opinion dated Oct. 27, 2017", 5 pgs.
Huaivei, Hisilicon, et al., "Clarifications on NPDCCH monitoring in 36.21", RI 164847 3GPP TSGRAN IYG1 Meeting 85 Nanjing China, (May 14, 2016), 1-3.
"Chinese Application Serial No. 201780031496.0, Office Action dated Oct. 12, 2020", w/o English Translation, 7 pgs.

* cited by examiner

FAST STEERING TIMING AND RESOURCE ALLOCATION

PRIORITY CLAIM

This application is a U.S. National Stage Filing under 35 U.S.C. 371 from International Application No. PCT/US2017/038599, filed Jun. 21, 2017, which claims priority under 35 U.S.C. § 119 to U.S. Provisional Patent Application Ser. No. 62/352,618, filed Jun. 21, 2016, and titled, "FAST STEERING TIMING AND RESOURCE ALLOCATION SIGNALING FOR NARROW BAND WI-FI SUB-CHANNELS WITHIN A SINGLE WIDE BAND CHANNEL," each of which are incorporated herein by reference in their entirety.

TECHNICAL FIELD

Embodiments pertain to wireless communications. Some embodiments pertain to systems and methods for fast steering timing and resource allocation signaling for narrow band Wi-Fi sub-channels within a single wide band channel.

BACKGROUND

As noted in Fifth Generation (5G) studies and objectives, multiple air interfaces may be useful in order to support narrow band Internet of Things (IoT) devices. Multiple air interfaces may be defined for 5G, where several narrow band and wide band technologies work in tandem. Systems and methods for fast steering timing and resource allocation signaling for narrow band Wi-Fi sub-channels within a single wide band channel may be desirable.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
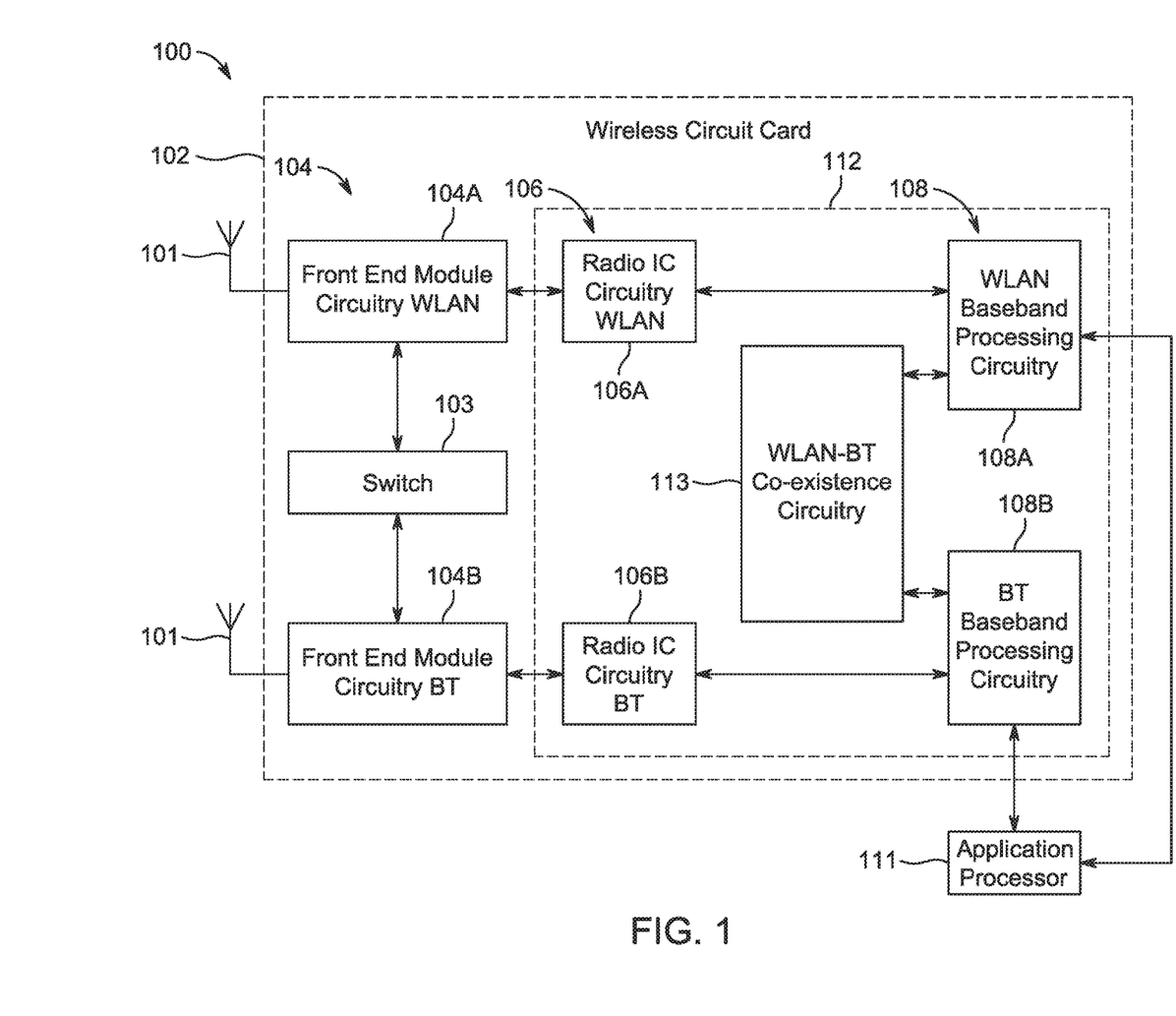
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WEAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify air signals provided by the radio IC circuitry 106B for wireless transmission by the one or more antennas. In the embodiment of FIG. 1, although FEM 104A and HEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide 13T RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (MY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards.

In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
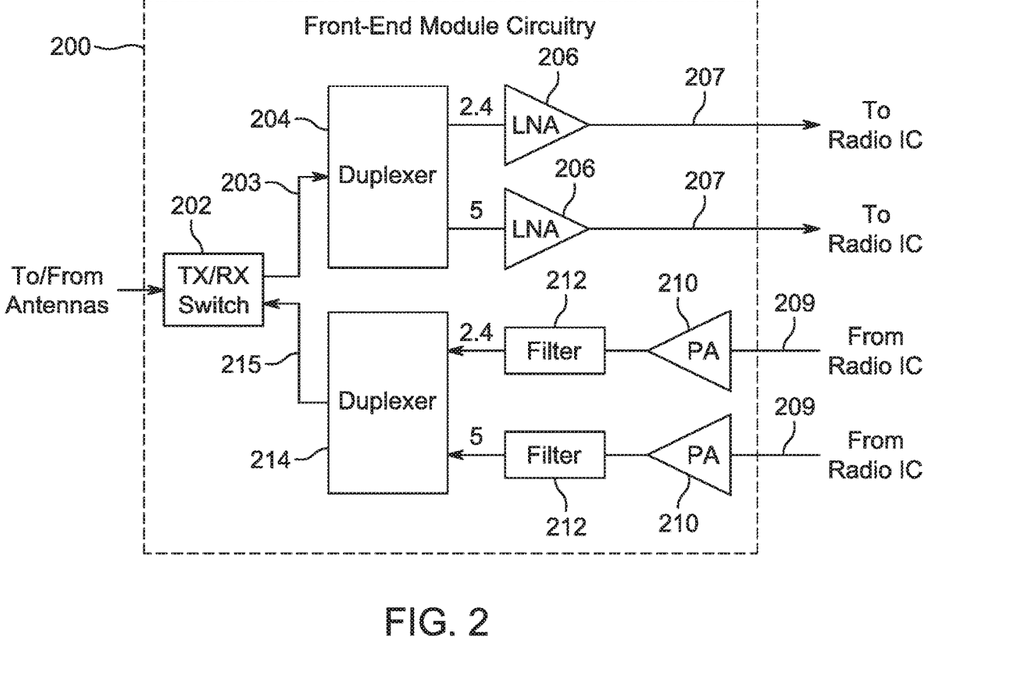
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency, spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
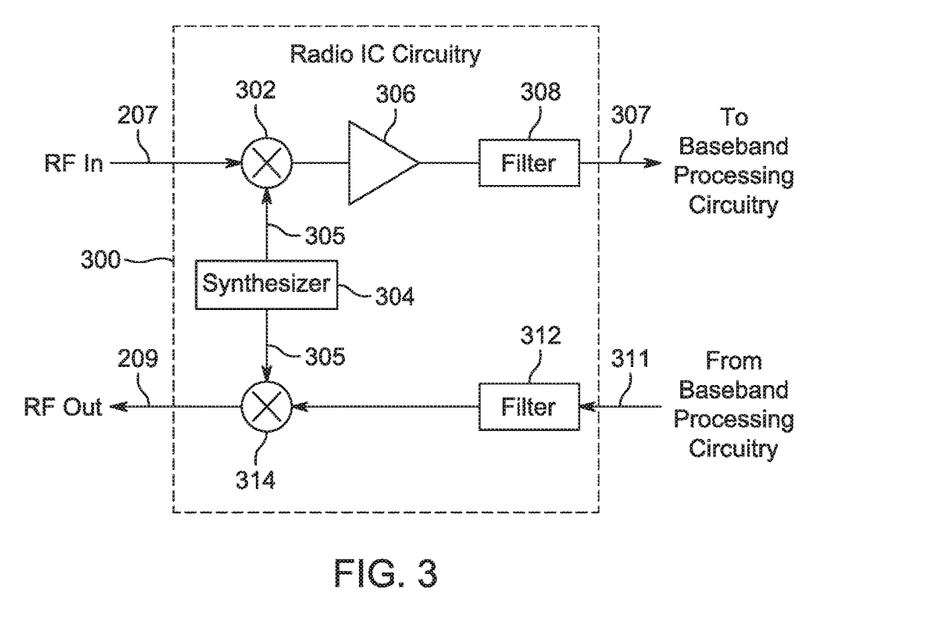
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the HEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a frequency (fLO).

Figure 4:
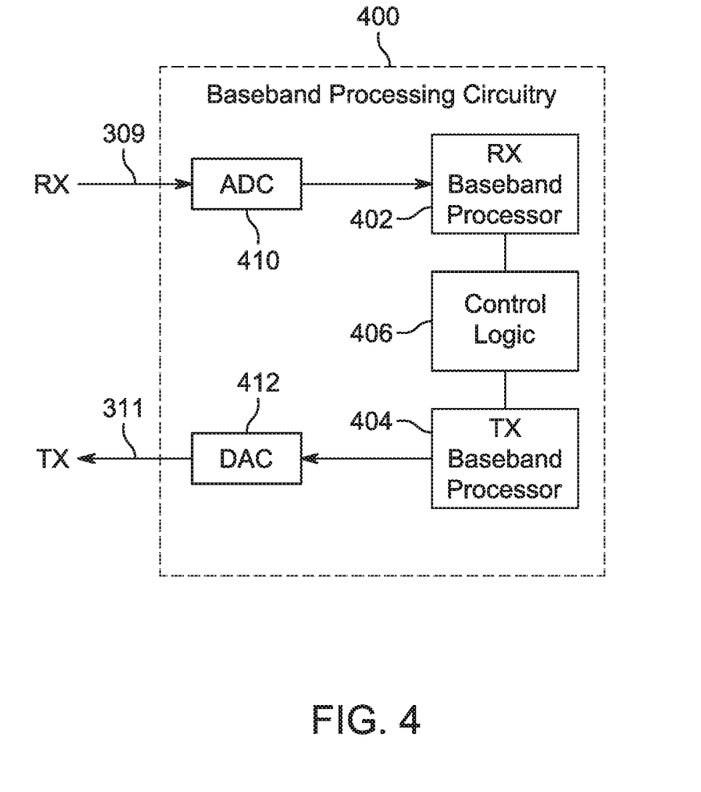
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX 1313P) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein, in some embodiments, the functional elements may refer to one or more processes operating on one or more processing elements.

As seen in Fifth Generation (5G) studies and objectives, multiple air interfaces may be useful to support low complexity narrow band Internet of Things (IoT) devices, Multiple air interfaces may be defined for 5G IoT, where several narrow band and wide band technologies operate in tandem.

One of the proposed solutions for the 5G need is an operation mode where a wide band device (e.g., an access point (AP) or base station subsystem (BSS)) is serving a set of narrow band devices simultaneously using a set of sub-channels accumulated within a single wider channel (e.g., the main channel).

In these cases, partial or full synchronization between the transmission and reception of each of the sub-channels is useful due to the low isolation between the sub-channels.

One solution for transmission (TX)/reception (RX) isolation is a central wide band coordination function (which may be located at the wide band device) that synchronizes the TX and the RX periods within the sub-channels. In some cases, there is a central coordination function and a distributed coordination function. At the central coordination function one function controls multiple wide band devices. At the distributed coordination function, the coordination is distributed between the wide band devices. One or more of the wide band devices acts as a decoupled serving channel.

Other solutions may include generating common control and management of narrow band sub-channels (i.e., the coordination function). The common management channel and the resource allocation function enable efficient network discovery (reduce number of discovery channels), simple (single) association, decisions for band selection, and the like.

Common control and management channel is a basic component at the current Third Generation Partnership Program (3GPP) architecture. In the 3GPP specification, one of the channels is selected as the control or management channel. Stations (STAs) that need a service are associated to this channel and then routed to other dedicated alternate channels.

Different narrow band sub-channels (within a single wide band channel) may operate in an uncoupled manner, for example, the TX/RX modes of the channels may be uncoupled, the sub-channels may have different loads and sub-channel condition, and the like. Thus, fast steering timing load balancing resource allocation signaling that steer STAs between these sub-channels to enable optimal assignment of sub-channels for congestion and interference avoidance may be desirable. Some aspects of the subject technology provide fast steering timing and resource allocation signaling for narrow band sub-channels.

In one example, narrow band sub-channels within a single wide band channel are 8*20 MHz sub-channels within a 160 MHz wide band channel and/or are 9*2 MHz sub-channels within a 20 MHz wide band channel, and the like.

The subject technology, in some aspects, is directed to a technique for fast steering timing and resource allocation signaling for narrow band Wi-Fi sub-channels within a single aggregated wide band channel.

The technique enables a STA to receive fast steering timing and resource allocation information from a signal transmitted at a centralized "primary" Narrow Band Control and management sub-Channel (NB-C-CH) and to obtain a service from assigned Narrow Band Service sub-Channels (NB-S-CH) (within a single aggregated wide band channel). According to some implementations, one of the sub-channels has been "selected" as the control and management sub-channel for narrow band device.

One principle of some aspects of the subject technology is to add a fast steering timing signaling element (STSE) in one of the pre-defined NB-C-CHs with fast steering timing and allocation information. Some aspects refer to a specific NB-S-CH for each STA or groups of STAs. STAs that decode this fast steering signaling can steer (temporary or constantly) to the indicated NB-S-CH. This steering may be STA-defined, AP indicated, or even negotiated between the AP and the STA. Additional signaling transmitted in the NB-S-CH can steer back the STA and to the NB-C-CH.

Some schemes do not support de-coupled operation of narrow band sub-channel fast steering. In particular narrow band sub-channels, fast steering timing and resource allocation signaling are not supported. Some schemes implement only slow steering approaches between operating bands as part of mobile broadband functionality.

Some advantages of some aspects of the subject technology over these schemes are described below. Some aspects provide simultaneous coordinated transmission from narrow band device, which are coordinated with minimal narrow band sub-channels interferences. Some aspects provide throughput optimizations, which include selection of the best resource allocation and optimal aggregated wide band channel within a set of narrow band sub-channels, based on a set of STAs request and quality of service (QoS) restrictions, Some aspects provide power optimization—a wake-up packet for the wake-up radio can be signaled in a single narrow band sub-channel. Some aspects provide frequency division duplex (FDD) support in the form of allocation for downlink (DL) and uplink (UL) sub-channels. Some aspects provide efficient network discovery by reducing the number of discovery sub-channels and enabling association and service within a set of narrow band sub-channels. Some aspects provide simple association and resource allocation. Some aspects provide air occupancy optimizations with minimal signaling transmission. Some aspects provide increased resource allocation reception reliability. Some aspects make multiband operation transparent to the upper layer.

Some aspects of the subject technology define a technique for support of multiple narrow band sub-channel operation (within a single aggregated wide band channel) using fast steering timing and resource allocation signaling at a pre-defined narrow band control and management sub-channel (NB-C-CH) As used herein, the "fast steering" timing refers to switching from one narrow band sub-channel to another narrow band sub-channel within less than a threshold time period, such as 50 microseconds.

According to some aspects, an allocator device (which may be an access point (AP) or a non-AP coordinator station) transmits a fast steering timing signaling element (STSE) at one of the NB-C-CH (within a single wide band sub-channel). The STSE signal to one or more non-access point stations (STAs) when (fast steering timing information and/or restrictions), to where (specific narrow band service sub-channel (NB-S-CH)), and how (resource allocation and connectivity information) to get a specific service. The STAs decode the STSE and steer to the indicated NB-S-CH and communicate with the allocator device.

The resource allocation and connectivity information that is indicated by the STSE may include one or more of the following: the selected NB-S-CH and/or NB-C-CH within a single aggregated wide band channel, the type of service to be provided in the NB-S-CH, connection and/or air infrastructure parameter(s) in the NB-S-CH, and fast steering timing information. The type of service that can be indicated by the STSE may include one or more of unidirectional uplink (UL) connectivity, unidirectional downlink (DL) connectivity, bidirectional UL/DL connectivity, schedule service request, unscheduled service request, control measurement and sounding signaling, low-power wake-up signaling, signaling based on schedule, legacy enhanced distributed channel access (EDCA) air access techniques, and the like. The allocation technique indicated by the STSE may include temporary fast steering, back fast steering, or other allocation technique(s). In temporary fast steering, the STA remains in the indicated NB-S-CH for a known period indicated by the STSE or until it is completely served. In back fast steering, the STA remains in the indicated NB-S-CH until the STA and/or the allocator device signals to steer to a new NB-S-CH and/or NB-C-CH.

According to some aspects of the subject technology, an aggregated wide band channel coordinator (CH-C) is located at the allocator device. The CH-C initiates and controls the narrow band sub-channel operation and scheduling. The CH-C is also responsible for synchronized transmission and reception periods/slots in the NB-S-CH. The CH-C may operate based on simultaneous transmission and synchronization between transmission (TX) and reception (RX) in the NB-S-CH. The CH-C may operate based on simultaneous transmission and synchronization between NB-S-CH/NB-C-CH transmission (TX) and reception (RX) of data in packets meeting an Institute of Electrical and Electronics Engineers (IEEE) 802.11 standard. The CH-C may operate based on throughput optimization in the NB-S-CH. The CH-C may operate based on load balancing or air occupancy balancing between a plurality of NB-S-CHs, including the NB-S-CH.

As used herein, the term "steering" may include switching from one narrow band channel to other narrow band channel(s). The phrase "fast steering" may include switching from one narrow band channel to other narrow band channel(s) within less than a threshold time period (e.g., 50 microseconds).

Figure 5:
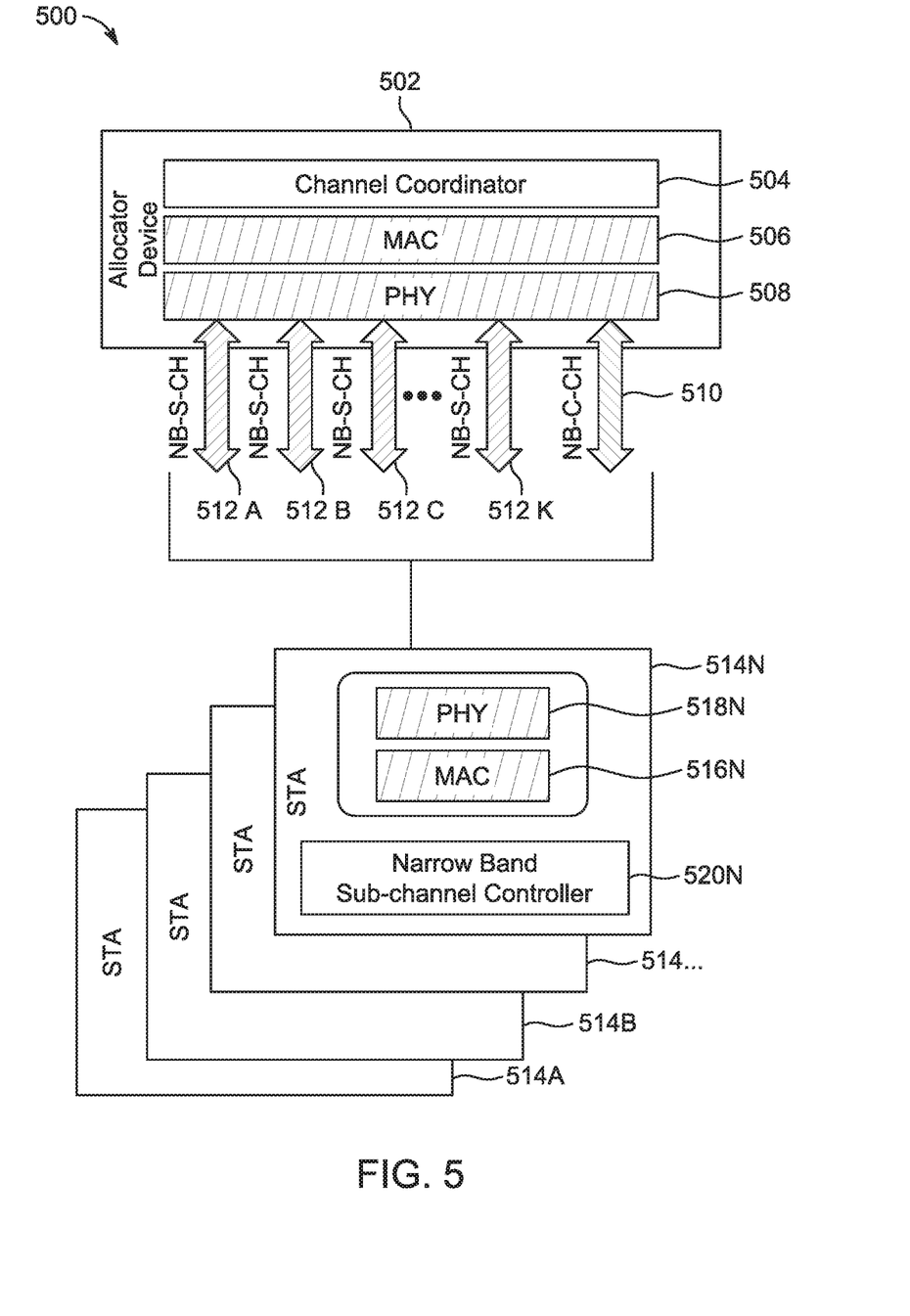
FIG. 5 illustrates an example system in which an allocator device is connected with multiple stations in accordance with some embodiments.

FIG. 5 illustrates an example system 500 in which an allocator device is connected with multiple stations in accordance with some embodiments. As shown, the system 500 includes an allocator device 502 and multiple STAs 514A-514N. The allocator device 502 includes the aggregated wide band channel coordinator (CH-C) 504, a media access control (MAC) layer 506, and a physical (PHY) layer 508. The NB-C-CH 510 and multiple NB-S-CHs 512A-512K reside within a single aggregated wide band channel. The STA 514N includes a PHY layer 518N, a MAC layer 516N, and a narrow band sub-channel controller 520N. Other STAs 514 include components similar to those of the STA 514N. In FIG. 5, the CH-C 504 is located at the allocator device 502. The allocator device 502 is connected simultaneously to a group of STAs 514A-514N via a set of NB-S-CHs 512A-512K and a single NB-C-CH 510.

Figure 6A:
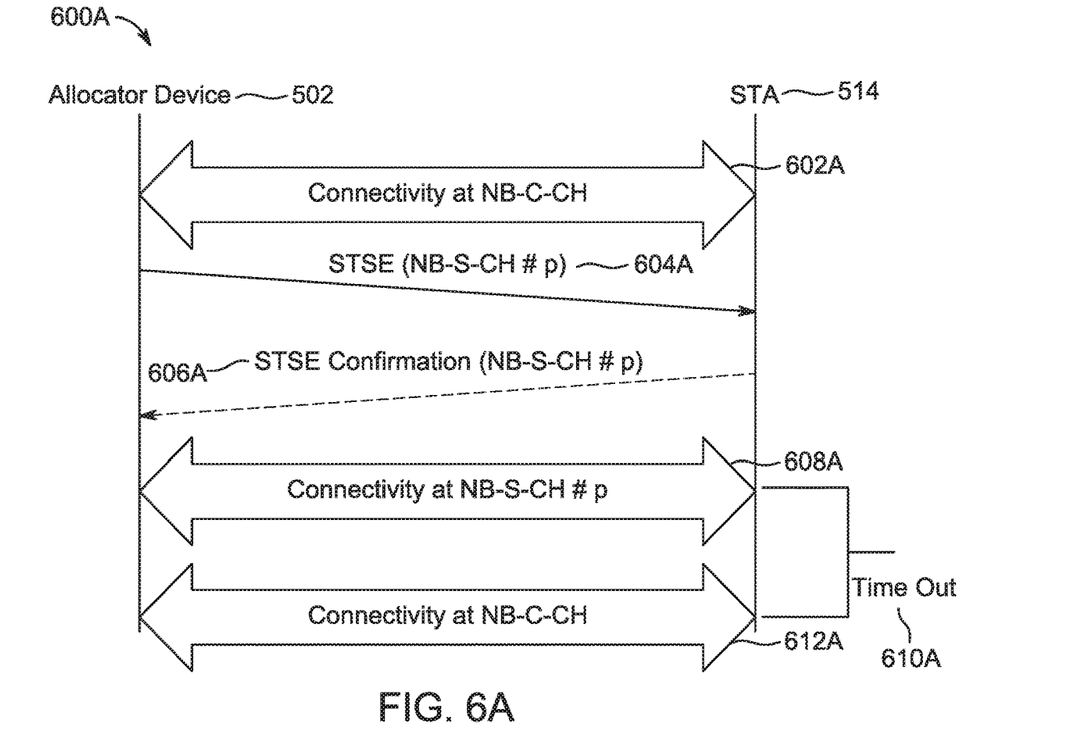
FIG. 6A illustrates an example time-based temporary fast steering method between an allocator device and a station in accordance with some embodiments.

FIG. 6A illustrates an example time-based temporary fast steering method 600A between the allocator device 502 and the station 514 in accordance with some embodiments. The STA 514 may correspond to any of the STAs 514A-514N.

At operation 602A, connectivity at the NB-C-CH 510 is established between the allocator device 502 and the STA 514. At operation 604A, a STSE identifying one of the NB-S-CHs 512$p$ (where 512$p$ represents a value between 512A and 512K) is transmitted from the allocator device 502 to the STA 514. At operation 606A, a STSE confirmation identifying the NB-S-CH 512$p$ is optionally transmitted from the STA 514 to the allocator device 502. At operation 608A, connectivity at the NB-S-CH 512$p$ is established between the allocator device 502 and the STA 514. At operation 610A, a time out takes place at the STA 514. At operation 612A, connectivity at the NB-C-CH 510 is re-established (after being cancelled during the time out of operation 610A) between the allocator device 502 and the STA 514.

Figure 6B:
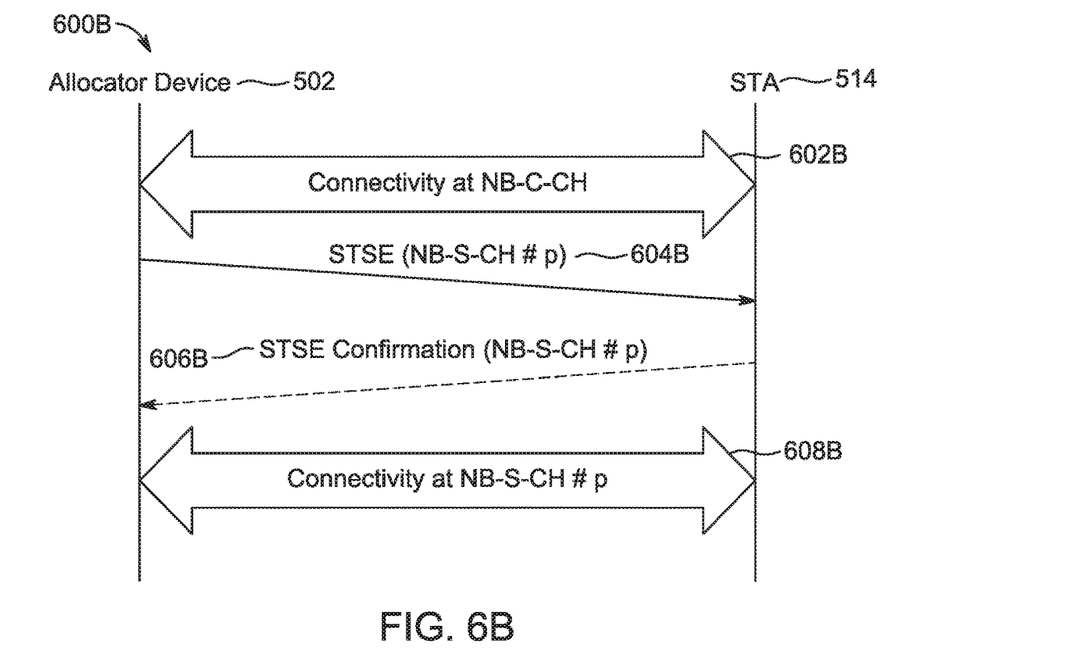
FIG. 6B illustrates an example steering timing signaling element (STSE) back fast steering method between an allocator device and a station in accordance with some embodiments.

FIG. 6B illustrates an example steering timing signaling element (STSE) back fast steering method 600B between an allocator device and a station in accordance with some embodiments. In accordance with the method 600B, the STA 514 remains at the indicate NB-S-CH 512$p$ until the STA 514 and/or the allocator device 502 signals to steer to a new NB-S-CH 512 and/or NB-C-CH 510.

At operation 602B, connectivity at the NB-C-CH 510 is established between the allocator device 502 and the STA 514. At operation 604B, a STSE identifying one of the NB-S-CHs 512$p$ (where 512$p$ represents a value between 512A and 512K) is transmitted from the allocator device 502 to the STA 514. At operation 606B, a STSE confirmation identifying the NB-S-CH 512$p$ is optionally transmitted from the STA 514 to the allocator device 502. At operation 608B, connectivity at the NB-S-CH 512$p$ is established between the allocator device 502 and the STA 514. After operation 608B, the STA 514 remains at the indicate NB-S-CH 512$p$ until the STA 514 and/or the allocator device 502 signals to steer to a new NB-S-CH 512 and/or NB-C-CH 510.

Figure 6C:
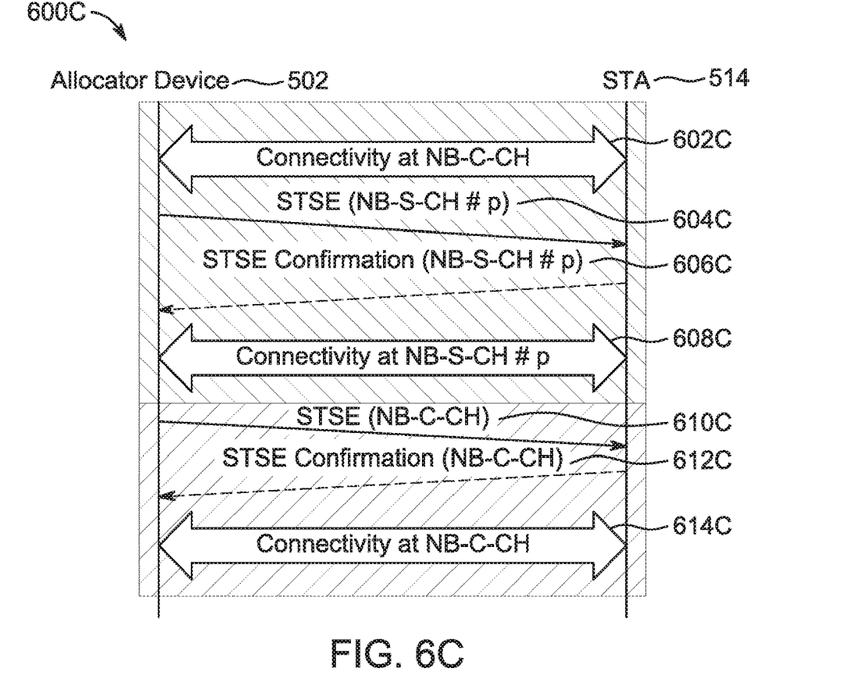
FIG. 6C illustrates an example allocator device-initiated back fast steering method in accordance with some embodiments.

FIG. 6C illustrates an example allocator device-initiated back fast steering method 600C in accordance with some embodiments.

At operation 602C, connectivity at the NB-C-CH 510 is established between the allocator device 502 and the STA 514. At operation 604C, a STSE identifying one of the NB-S-CHs 512$p$ (where 512$p$ represents a value between 512A and 512K) is transmitted from the allocator device 502 to the STA 514. At operation 606C, a STSE confirmation identifying the NB-S-CH 512$p$ is optionally transmitted from the STA 514 to the allocator device 502. At operation 608C, connectivity at the NB-S-CH 512$p$ is established between the allocator device 502 and the STA 514. At operation 610C, a STSE identifying the NB-C-CH 510 is transmitted from the allocator device 502 to the STA 514. At operation 612C, a STSE confirmation identifying the NB-C-CH 510 is optionally transmitted from the STA 514 to the allocator device 502. At operation 614C, connectivity at the NB-C-CH 510 is established between the allocator device 502 and the STA 514.

Figure 6D:
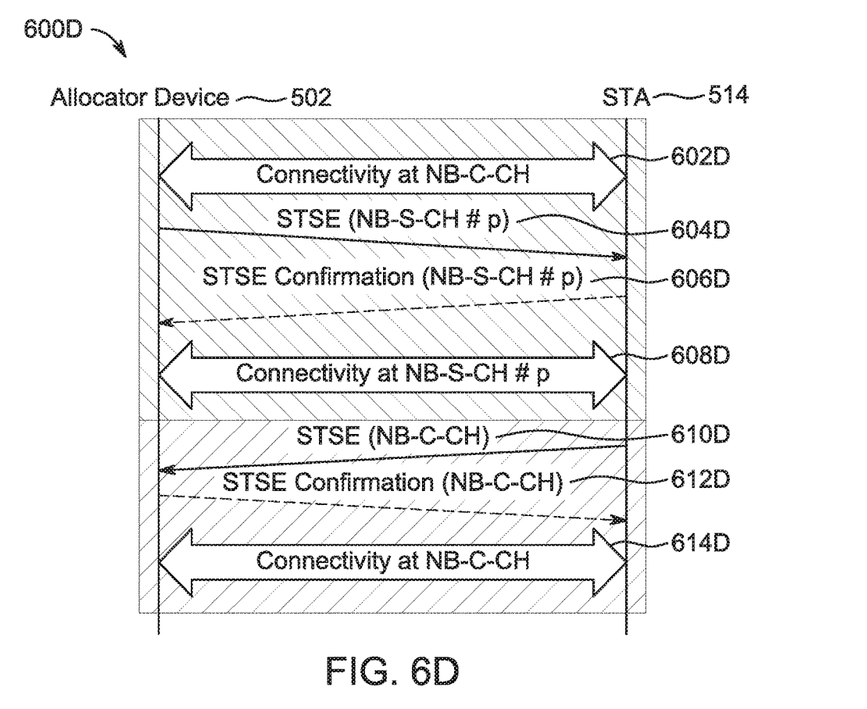
FIG. 6D illustrates an example station-initiated back fast steering method in accordance with some embodiments.

FIG. 6D illustrates an example station-initiated back fast steering method 600D in accordance with some embodiments.

At operation 602D, connectivity at the NB-C-CH 510 is established between the allocator device 502 and the STA 514. At operation 604D, a STSE identifying one of the NB-S-CHs 512$p$ (where 512$p$ represents a value between 512A and 512K) is transmitted from the allocator device 502 to the STA 514. At operation 606D, a STSE confirmation identifying the NB-S-CH 512$p$ is optionally transmitted from the STA 514 to the allocator device 502. At operation 608D, connectivity at the NB-S-CH 512$p$ is established between the allocator device 502 and the STA 514. At operation 610D, a STSE identifying the NB-C-CH 510 is transmitted from the STA 514 to the allocator device 502. At operation 612D, a STSE confirmation identifying the NB-C-CH 510 is optionally transmitted from the allocator device 502 to the STA 514. At operation 614D, connectivity at the NB-C-CH 510 is established between the allocator device 502 and the STA 514.

It should be noted that differences between the methods 600C and 600D include differences in the operations 610C/610D and the operations 612C/612D.

Figure 7:
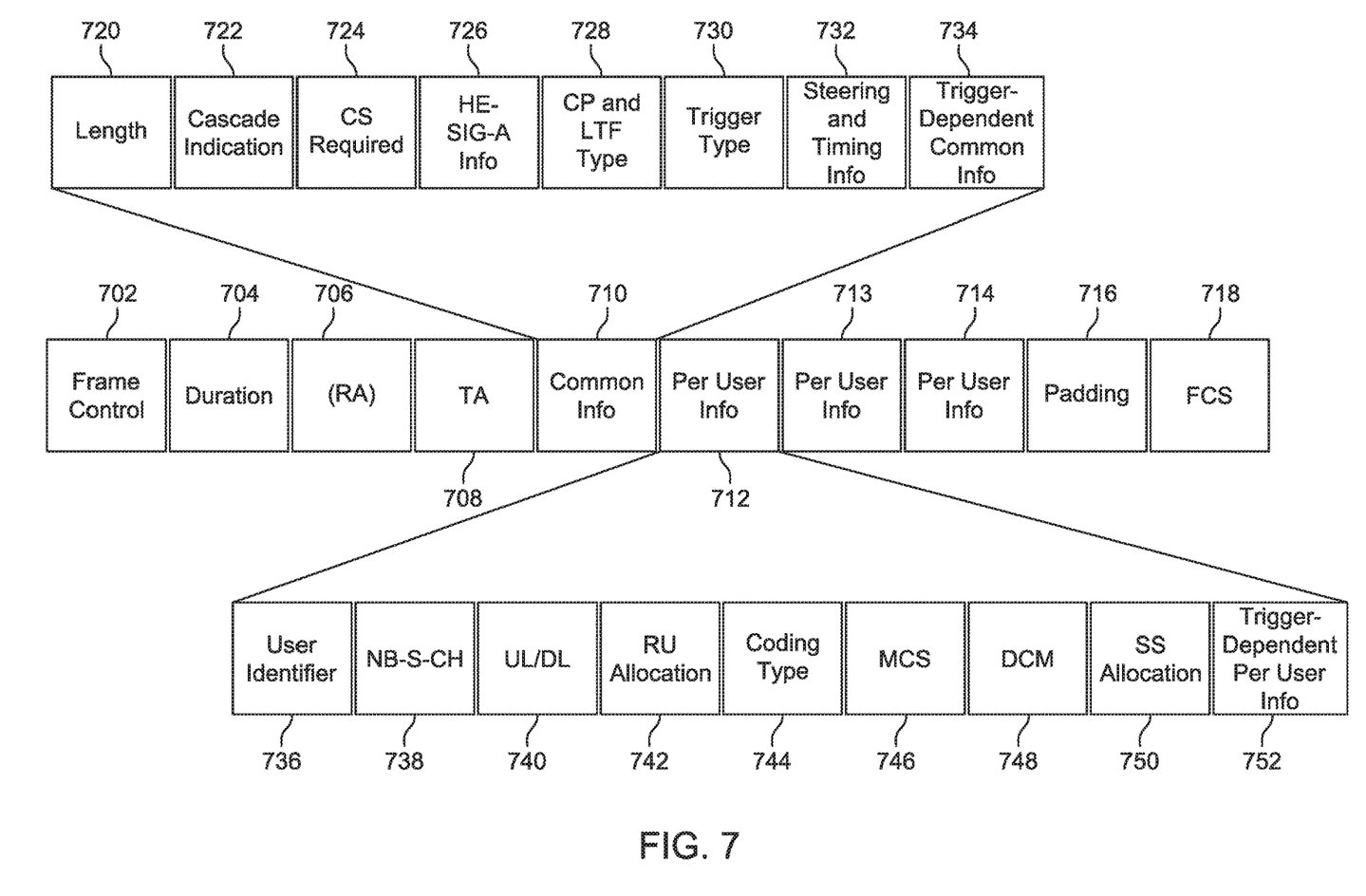
FIG. 7 illustrates an example STSE format in accordance with some embodiments.

FIG. 7 illustrates an example STSE format 700 in accordance with some embodiments. The STSE format 700 uses a modified single band trigger frame element. The STSE format 700 reuses the trigger frame of IEEE standard 802.11ax. The STSE format 700 is configured to add information that is relevant to narrow band sub-channel fast steering timing and resource allocation signaling in the trigger frame common field and/or in the per user trigger frame field. The STSE format 700 is configured indicate fast steering timing and resource allocation signaling to a narrow band sub-channel.

As shown, the STSE format 700 includes a frame control 702, a duration 704, a receiver address (RA) 706, a transmitter address (TA) 708, common information (info) 710, a first portion of per user info 712, a middle portion of per user info 713, a last portion of per user info 714, padding 716, and frame check sequence (FCS) 718.

The common info 710 includes a length 720, a cascade indication 722, carrier sense (CS) required 724, high efficiency signal A information (HE-SIG-A info) 726, a contention period (CP) and long training field (LTF) type 728, a trigger type 730, a steering and timing info 732, and trigger-dependent common info 734. At least the trigger type 730 and the steering and timing info 732 are added by some aspects of the subject technology.

The first portion of per user info 712 includes a user identifier 736, a NB-S-CH 738, UL/DL 740, a resource unit (RU) allocation 742, a coding type 744, a modulation and coding scheme (MCS) 746, a dual sub-carrier modulation (DCM) 748, station service (SS) allocation 750, and trigger dependent per user info 752, At least the NB-S-CH 738 and the UL/DL 740 are added by some aspects of the subject technology.

The subject technology is described below in conjunction with various examples.

Example 1 is an apparatus of a non-access point station (STA), the apparatus comprising: memory; and processing circuitry, the processing circuitry to: decode a fast steering timing signaling element (STSE) at a Narrow Band Control sub-Channel (NB-C-CH) and from an allocator device, the STSE indicating at least fast steering timing information, an identified Narrow Band Service sub-Channel (NB-S-CH), resource allocation information for the identified NB-S-CH, and connectivity information for the identified NB-S-CH, the identified NB-S-CH being selected from a plurality of NB-S-CHs; exchange packets in the NB-S-CH according to the resource allocation information and the connectivity information and based on the fast steering timing information; and encode or decode data associated with the exchanged packets.

Example 2 is the apparatus of Example 1, wherein the plurality of NB-S-CBs and the NB-C-CU reside within a single wide band channel, and wherein the single wide band channel comprises a channel within an operating band.

Example 3 is the apparatus of any of Examples 1-2, wherein the resource allocation information or the connectivity information comprises a type of service to be provided in the identified NB-S-CH.

Example 4 is the apparatus of Example 3, wherein the type of service comprises one or more of: unidirectional uplink (UL) connectivity, unidirectional downlink (DL) connectivity, bidirectional UL/DL connectivity, schedule service request, unscheduled service request, control measurement and sounding signaling, low-power wake-up signaling, signaling based on schedule, and/or legacy enhanced distributed channel access (EDCA) air access techniques.

Example 5 is the apparatus of any of Examples 1-2, wherein the resource allocation information or the connectivity information comprises a connection parameter or an air interface parameter that indicates a connectivity mode of the NB-S-CH.

Example 6 is the apparatus of any of Examples 1-2, wherein the resource allocation information indicates temporary fast steering for the STA, the processing circuitry further to: remain in the indicated NB-S-CH for a predetermined time period or until the STA is completely served, wherein the fast steering comprises channel selection for the STA.

Example 7 is the apparatus of any of Examples 1-2, wherein the resource allocation information indicates temporary fast steering for the STA, the processing circuitry further to: remain in the indicated NB-S-CH for a predetermined time period or until the STA is served with a single PPDU (PLCP (Physical Layer Convergence Protocol) Protocol Data Unit)/TXOP (Transmission Opportunity).

Example 8 is the apparatus of any of Examples 1-2, wherein the resource allocation information indicates back fast steering for the STA, the processing circuitry further to: remain in the indicated NB-S-CH until the STA or the allocator device signals to steer to a new NB-S-CH or a new NB-C-CH.

Example 9 is the apparatus of any of Examples 1-2, wherein the processing circuitry comprises a baseband processor.

Example 10 is the apparatus of any of Examples 1-2, further comprising the transceiver circuitry, the transceiver circuitry to: receive the STSE; and exchange the packets in the NB-S-CH.

Example 11 is the apparatus of Example 10, further comprising an antenna coupled to the transceiver circuitry.

Example 12 is an apparatus of an allocator device, the apparatus comprising: memory; and processing circuitry, the processing circuitry to: encode, for transmission to a non-access point station (STA) via Narrow Band Control sub-Channel (NB-C-CH), a fast steering timing signaling element (STSE) indicating at least fast steering timing information, an identified Narrow Band Service sub-Channel (NB-S-CH), resource allocation information for the identified NB-S-CH, and connectivity information for the identified NB-S-CH, the identified NB-S-CH being selected from a plurality of NB-S-CHs; exchange packets with the STA in the NB-S-CH according to the resource allocation information and the connectivity information and based on the fast steering timing information; initiate and control, via a channel coordinator (CH-C) of the allocator device, operation and scheduling of the NB-C-CH and the NB-S-CH of the STA using the STSE; and synchronize, via the CH-C, transmission and reception periods of the NB-S-CH using the STSE.

Example 13 is the apparatus of Example 12, wherein the CH-C operates based on simultaneous transmission and synchronization between transmission (TX) and reception (RX) in the NB-S-CH.

Example 14 is the apparatus of Example 12, wherein the CH-C operates based on simultaneous transmission and synchronization between NB-S-CH/NB-C-CH transmission (TX) and reception (RX) of data in packets meeting an Institute of Electrical and Electronics Engineers (IEEE) 802.11 standard.

Example 15 is the apparatus of Example 12, wherein the CH-C operates based on throughput optimization in the NB-S-CH.

Example 16 is the apparatus of Example 12, wherein the CH-C operates based on load balancing or air occupancy balancing between a plurality of NB-S-CHs, including the NB-S-CH.

Example 17 is the apparatus of Example 12, wherein the allocator device comprises an access point.

Example 18 is the apparatus of Example 12, wherein the allocator device comprises a non-access point coordinator station.

Example 19 is the apparatus of Example 12, wherein the CH-C of the allocator device allocates resources via the STSE.

Example 20 is the apparatus of Example 12, the processing circuitry further to: encode, for transmission to a serving access point (AP), an indication that the STA is assigned to the identified NB-S-CH.

Example 21 is a machine-readable medium storing instructions for execution by processing circuitry of a non-access point station (STA), the instructions causing the processing circuitry to: decode a fast steering timing signaling element (STSE) at a Narrow Band Control sub-Channel (NB-C-CH) and from an allocator device, the STSE indicating at least fast steering timing information, an identified Narrow Band Service sub-Channel (NB-S-CH), resource allocation information for the identified NB-S-CH, and connectivity information for the identified. NB-S-CH, the identified NB-S-CH being selected from a plurality of NB-S-CHs; exchange packets in the NB-S-CH according to the resource allocation information and the connectivity information and based on the fast steering timing information; and encode or decode data associated with the exchanged packets.

Example 22 is the machine-readable medium of Example 21, wherein the plurality of NB-S-CHs and the NB-C-CH reside within a single wide band channel, and wherein the single wide band channel comprises a channel within an operating band.

Example 23 is the machine-readable medium of Example 21, wherein the resource allocation information or the connectivity information comprises a type of service to be provided in the identified NB-S-CH.

Example 24 is the machine-readable medium of Example 23, wherein the type of service comprises one or more of: unidirectional uplink (UL) connectivity, unidirectional downlink (DL) connectivity, bidirectional UL/DL connectivity, schedule service request, unscheduled service request, control measurement and sounding signaling, low-power wake-up signaling, signaling based on schedule, and/or legacy enhanced distributed channel access (EDCA) air access techniques.

Example 25 is a method, implemented by processing circuitry of a non-access point station (STA); the method comprising: decoding a fast steering timing signaling element (STSE) at a Narrow Band Control sub-Channel (NB-C-CH) and from an allocator device, the STSE indicating at least fast steering timing information, an identified Narrow Band Service sub-Channel (NB-S-CH), resource allocation information for the identified NB-S-CH, and connectivity information for the identified NB-S-CH, the identified NB-S-CH being selected from a plurality of NB-S-CHs; exchanging packets in the NB-S-CH according to the resource allocation information and the connectivity information and based on the fast steering timing information; and encoding or decoding data associated with the exchanged packets.

Example 26 is the method of Example 25, wherein the plurality of NB-S-CHs and the NB-C-CH reside within a single wide band channel, and wherein the single wide band channel comprises a channel within an operating band.

Example 27 is the method of Example 25, wherein the resource allocation information or the connectivity information comprises a type of service to be provided in the identified NB-S-CH.

Example 28 is the method of Example 27, wherein the type of service comprises one or more of: unidirectional uplink (UL) connectivity, unidirectional downlink (DL) connectivity, bidirectional UL/DL connectivity, schedule service request, unscheduled service request, control measurement and sounding signaling, low-power wake-up signaling, signaling based on schedule, and/or legacy enhanced distributed channel access (EDCA) air access techniques.

Example 29 is an apparatus of a non-access point station (STA); the apparatus comprising: means for decoding a fast steering timing signaling element (STSE) at a Narrow Band. Control sub-Channel (NB-C-CH) and from an allocator device, the STSE indicating at least fast steering timing information, an identified Narrow Band Service sub-Channel (NB-S-CH), resource allocation information for the identified NB-S-CH, and connectivity information for the identified NB-S-CH, the identified NB-S-CH being selected from a plurality of NB-S-CHs; means for exchanging packets in the NB-S-CH according to the resource allocation information and the connectivity information and based on the fast steering timing information; and means for encoding or decoding data associated with the exchanged packets.

Example 30 is the apparatus of Example 29, wherein the plurality of NB-S-CHs and the NB-C-CH reside within a single wide band channel, and wherein the single wide band channel comprises a channel within an operating band.

Example 31 is the apparatus of Example 29, wherein the resource allocation information or the connectivity information comprises a type of service to be provided in the identified NB-S-CH.

Example 32 is the apparatus of Example 31, wherein the type of service comprises one or more of: unidirectional uplink (UL) connectivity, unidirectional downlink (DL) connectivity, bidirectional UL/DL connectivity, schedule service request, unscheduled service request, control measurement and sounding signaling, low-power wake-up signaling, signaling based on schedule, and/or legacy enhanced distributed channel access (EDCA) air access techniques.

Although an embodiment has been described with reference to specific example embodiments, it will be evident that various modifications and changes may be made to these embodiments. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a non-access point station (STA), the apparatus comprising:
memory; and processing circuitry, the processing circuitry configured to:
decode a fast steering timing signaling element (STSE) at a Narrow Band Control sub-Channel (NB-C-CH) and from an allocator device; the STSE indicating at least fast steering timing information, an identified Narrow Band Service sub-Channel (NB-S-CH), resource allocation information for the identified NB-S-CH, and connectivity information for the identified NB-S-CH, the identified NB-S-C H being selected from a plurality of NB-S-CHs;
exchange packets in the NB-S-CH according to the resource allocation information and the connectivity information and based on the fast steering timing information; and
encode or decode data associated with the exchanged packets.

2. The apparatus of claim 1, wherein the plurality of NB-S-CHs and the NB-C-CH reside within a single wide band channel, and wherein the single wide band channel comprises a channel within an operating band.

3. The apparatus of claim 1, wherein the resource allocation information or the connectivity information comprises a type of service to be provided in the identified NB-S-CH.

4. The apparatus of claim 3, wherein the type of service comprises one or more of: unidirectional uplink (UL) connectivity, unidirectional downlink (DL) connectivity, bidirectional UL/DL connectivity, schedule service request, unscheduled service request, control measurement and sounding signaling, low-power wake-up signaling, signaling based on schedule, and/or legacy enhanced distributed channel access (EDCA) air access techniques.

5. The apparatus of claim 1, wherein the resource allocation information or the connectivity information comprises a connection parameter or an air interface parameter that indicates a connectivity mode of the NB-S-CH.

6. The apparatus of claim 1, wherein the resource allocation information indicates temporary fast steering for the STA, the processing circuitry further configured to:
remain in the indicated NB-S-CH for a predetermined time period or until the STA is completely served, wherein the fast steering comprises channel selection for the STA.

7. The apparatus of claim 1, wherein the resource allocation information indicates temporary fast steering for the STA, the processing circuitry further configured to:
remain in the indicated NB-S-CH for a predetermined time period or until the STA is served with a single PPDU(PLCP (Physical Layer Convergence Protocol) Protocol Data Unit)/TXOP (Transmission Opportunity).

8. The apparatus of claim 1, wherein the resource allocation information indicates back fast steering for the STA, the processing circuitry further configured to:
remain in the indicated NB-S-CH until the STA or the allocator device signals to steer to a new NB-S-CH or a new NB-C-CH.

9. The apparatus of claim 1, wherein the processing circuitry comprises a baseband processor.

10. The apparatus of claim 1, further comprising the transceiver circuitry, the transceiver circuitry configured to:
receive the STSE; and
exchange the packets in the NB-S-CH.

11. The apparatus of claim 10, further comprising an antenna coupled to the transceiver circuitry.

12. An apparatus of an allocator device, the apparatus comprising:
memory; and processing circuitry, the processing circuitry configured to:
encode, for transmission to a non-access point station (STA) via Narrow Band Control sub-Channel (NB-C-CH), a fast steering timing signaling element (STSE) indicating at least fast steering timing information, an identified Narrow Band Service sub-Channel (NB-S-CH), resource allocation information for the identified NB-S-CH, and connectivity information for the identified NB-S-CH, the identified NB-S-CH being selected from a plurality of NB-S-CHs;
exchange packets with the STA in the NB-S-CH according to the resource allocation information and the connectivity information and based on the fast steering timing information;
initiate and control, via a channel coordinator (CH-C) of the allocator device, operation and scheduling of the NB-C-CH and the NB-S-CH of the STA using the STSE; and
synchronize, via the CH-C, transmission and reception periods of the NB-S-CH using the STSE.

13. The apparatus of claim 12, wherein the CH-C operates based on simultaneous transmission and synchronization between transmission (TX) and reception (RX) in the NB-S-CH.

14. The apparatus of claim 12, wherein the CH-C operates based on simultaneous transmission and synchronization between NB-S-CH/NB-C-CH transmission (TX) and reception (RX) of data in packets meeting an Institute of Electrical and Electronics Engineers (IEEE) 802.11 standard.

15. The apparatus of claim 12, wherein the CH-C operates based on throughput optimization in the NB-S-CH.

16. The apparatus of claim 12, wherein the CH-C operates based on load balancing or air occupancy balancing between a plurality of NB-S-CHs, including the NB-S-CH.

17. The apparatus of claim 12, wherein the allocators device comprises an access point.

18. The apparatus of claim 12, wherein the allocator device comprises a non-access point coordinator station.

19. The apparatus of claim 12, wherein the CH-C of the allocator device allocates resources via the STSE.

20. The apparatus of claim 12, the processing circuitry further configured to:
encode, for transmission to a serving access point (AP), an indication that the STA is assigned to the identified NB-S-CH.

21. A non-transitory computer-readable storage medium that stores instructions for execution by processing circuitry of a non-access point station (STA), the instructions to configure the processing circuitry to:

decode a fast steering timing signaling element (STSE) at a Narrow Band Control sub-Channel (NB-C-CH) and from an allocator device, the STSE indicating at least fast steering timing information, an identified Narrow Band Service sub-Channel (NB-S-CH), resource allocation information for the identified NB-S-CH, and connectivity information for the identified NB-S-CH, the identified NB-S-CH being selected from a plurality of NB-S-CHs;

exchange packets in the NB-S-CH according to the resource allocation information and the connectivity information and based on the fast steering timing information; and encode or decode data associated with the exchanged packets.

22. The non-transitory computer-readable storage medium of claim 21, wherein the plurality of NB-S-CHs and the NB-C-CH reside within a single wide band channel; and wherein the single wide band channel comprises a channel within an operating band.

23. The non-transitory computer-readable storage medium of claim 21, wherein the resource allocation information or the connectivity information comprises a type of service to be provided in the identified NB-S-CH.

24. The non-transitory computer-readable storage medium of claim 23, wherein the type of service comprises one or more of: unidirectional uplink (UL) connectivity, unidirectional downlink (DL) connectivity, bidirectional UL/DL connectivity, schedule service request, unscheduled service request, control measurement and sounding signaling, low-power wake-up signaling, signaling based on schedule, and/or legacy enhanced distributed channel access (EDCA) air access techniques.

25. A method, implemented by processing circuitry of a non-access point station (STA), the method comprising:

decoding a fast steering timing signaling element (STSE) at a Narrow Band Control sub-Channel (NB-C-CH) and from an allocator device, the STSE indicating at least fast steering timing information, an identified Narrow Band Service sub-Channel (NB-S-CH), resource allocation information for the identified NB-S-CH, and connectivity information for the identified NB-S-CH, the identified NB-S-CH being selected from a plurality of NB-S-CHs;

exchanging packets in the NB-S-CH according to the resource allocation information and the connectivity information and based on the fast steering timing information; and encoding or decoding data associated with the exchanged packets.

26. The method of claim 25, wherein the plurality of NB-S-CHs and the NB-C-CH reside within a single wide band channel, and wherein the single wide band channel comprises a channel within an operating band.

27. The method of claim 25, wherein the resource allocation information or the connectivity information comprises a type of service to be provided in the identified NB-S-CH.

28. The method of claim 27, wherein the type of service comprises one or more of: unidirectional uplink (UL) connectivity, unidirectional downlink (DL) connectivity, bidirectional UL/DL connectivity, schedule service request, unscheduled service request, control measurement and sounding signaling, low-power wake-up signaling, signaling based on schedule, and/or legacy enhanced distributed channel access (EDCA) air access techniques.

* * * * *

UNITED STATES PATENT AND TRADEMARK OFFICE
CERTIFICATE OF CORRECTION

PATENT NO. : 11,044,685 B2
APPLICATION NO. : 16/305769
DATED : June 22, 2021
INVENTOR(S) : Alpert et al.

Page 1 of 1

It is certified that error appears in the above-identified patent and that said Letters Patent is hereby corrected as shown below:

On the Title Page

Item (72), in "Inventors", in Column 1, Line 1, delete "Hod Hasharoni" and insert --Hod Hasharon-- therefor In the Claims In Column 17, Line 20, in Claim 1, delete "device;" and insert --device,-- therefor In Column 17, Line 25, in Claim 1, delete "NB-S-C H" and insert --NB-S-CH-- therefor In Column 17, Line 65, in Claim 7, delete "PPDU(PLCP" and insert --PPDU (PLCP-- therefor In Column 18, Line 53, in Claim 17, delete "allocators" and insert --allocator-- therefor In Column 19, Line 18, in Claim 22, delete "channel;" and insert --channel,-- therefor Signed and Sealed this
Fifth Day of October, 2021

Drew Hirshfeld
*Performing the Functions and Duties of the
Under Secretary of Commerce for Intellectual Property and
Director of the United States Patent and Trademark Office*